(12) United States Patent
Feng et al.

(10) Patent No.: US 9,323,100 B1
(45) Date of Patent: Apr. 26, 2016

(54) COLOR FILTER SUBSTRATE AND DISPLAY COMPONENT

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Wei Feng, Beijing (CN); Hui Wang, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 14/749,943

(22) Filed: Jun. 25, 2015

(30) Foreign Application Priority Data

Jan. 8, 2015 (CN) .......................... 2015 1 0009253

(51) Int. Cl.
| | |
|---|---|
| *G02F 1/136* | (2006.01) |
| *G02F 1/1335* | (2006.01) |
| *G02F 1/1368* | (2006.01) |
| *G02F 1/1339* | (2006.01) |
| *G02F 1/1362* | (2006.01) |
| *G02B 5/20* | (2006.01) |

(52) U.S. Cl.
CPC .......... *G02F 1/133514* (2013.01); *G02B 5/201* (2013.01); *G02F 1/1339* (2013.01); *G02F 1/1368* (2013.01); *G02F 1/133512* (2013.01); *G02F 1/136204* (2013.01)

(58) Field of Classification Search
CPC .............................. G02F 1/1345; H01L 27/124
USPC ................................................ 349/42, 46, 113
See application file for complete search history.

(56) References Cited

U.S. PATENT DOCUMENTS

| | | | |
|---|---|---|---|
| 6,392,735 B1 * | 5/2002 | Tani .................... | G02F 1/13394 349/153 |
| 6,466,294 B1 * | 10/2002 | Yamagishi ............ | G02F 1/1339 29/830 |
| 2007/0120152 A1 * | 5/2007 | Chang ................ | G02F 1/133345 257/270 |
| 2013/0120231 A1 * | 5/2013 | Jo ........................ | G02F 1/13452 345/98 |
| 2014/0267999 A1 * | 9/2014 | Kim ...................... | G02F 1/1345 349/152 |

* cited by examiner

*Primary Examiner* — David Vu
*Assistant Examiner* — Brandon Fox
(74) *Attorney, Agent, or Firm* — Baker Hostetler LLP

(57) ABSTRACT

The present disclosure relates to the field of liquid crystal display technologies, and discloses a color filter substrate and a display component. For a display component which takes a transverse electric field as a driving electric field, when a part of a black matrix of a color filter substrate is located at a non-display region, the black matrix includes a portion to be connected, and a predetermined voltage is applied to the black matrix through the portion to be connected, so as to ensure that a voltage difference between the black matrix and a pixel electrode or between the black matrix and a common electrode is small enough to be unable to drive liquid crystal molecules to deflect, thereby avoiding undesirable phenomenon such as becoming green when displaying in dark state, and improving production yield and display quality.

14 Claims, 2 Drawing Sheets

COLOR FILTER SUBSTRATE AND DISPLAY COMPONENT

CROSS-REFERENCE TO RELATED APPLICATION

This application claims a priority to Chinese Patent Application No. 201510009253.X filed on Jan. 8, 2015, the disclosure of which is incorporated in its entirety by reference herein.

TECHNICAL FIELD

The present disclosure relates to the field of liquid crystal display technologies, and more particularly to a color filter substrate and a display component.

BACKGROUND

Thin film transistor liquid crystal displays (TFT-LCDs) have such advantages as small volume, low power consumption, free of radiation and low manufacture cost, and have dominated position in the current planarization panel display market. A liquid crystal panel is an important component in the liquid crystal display. As shown in FIG. 1 and FIG. 2, the liquid crystal panel includes a color filter substrate 1 and an array substrate 2 which is oppositely arranged with respective to the color filter substrate 1 to form a cell. A sealed space is formed between the color filter substrate 1 and the array substrate 2 through a sealant 4. The sealed space is filled with liquid crystal. A black matrix 3 is formed on the color filter substrate, and is configured to define a plurality of subpixel regions in a display region 100. A filter layer (i.e., a red filter layer 31, a green filter layer 32, a blue filter layer 33 and a white filter layer 34) configured to transmit light of specific colors is disposed in the subpixel regions to realize color display. A planarization layer 20 is covered on the black matrix 3 and the filter layer. The presence of the black matrix 3 can prevent light leaking and occurrence of color crosstalk in adjacent subpixel regions.

In the related art, the black matrix may be distributed in two modes in which edges of the black matrix are flush with edges of the color filter substrate, or not flush with the edges of the color filter substrate. For the mode in which the edges of the black matrix are not flush with the edges of the color filter substrate, there is a distance of 0.2 μm~0.4 μm between edges of the black matrix and the edge of the color filter substrate. In this mode, there is a problem of light leaking from a periphery of the liquid crystal panel when the liquid crystal panel is in a dark state. Particularly, there is a dense region having a large amount of parallel metal wirings at a position close to the edge, this problem is more serious. For the mode in which the edges of the black matrix are flush with the edges of the color filter substrate, the problem of light leaking from the periphery of the liquid crystal panel when the liquid crystal panel is in a dark state is not existed.

For a TFT-LCD which takes a transverse electric field to drive liquid crystal molecules to deflect, both a common electrode and a pixel electrode are formed on the array substrate. Typical material for the black matrix has a resistance value of about $10^6\Omega \sim 10^7\Omega$, and is not a complete insulator. A resistance value of material for the planarization layer is much larger, about $10^{15}\Omega \sim 10^{16}\Omega$. For a TFT-LCD of large size, a common voltage and a pixel voltage are usually high. The black matrix can induce a certain amount of charge due to the capacitor effect, i.e., there is a certain induced voltage. After testing, the block matrix has an induced voltage of about +5V~+7V, which is close to a pixel voltage or a voltage (Vcom, about +8V) of the common electrode when the liquid crystal panel is in a dark state. However, for the black matrix with edges flush with the edges of the color filter substrate, the black matrix is easily grounded or contacts other low voltages, and then the charge is discharged, which leads to a drop of the induced voltage of the block matrix, resulting in that a voltage difference between the induced voltage and the pixel voltage, or between the induced voltage and the voltage of the common electrode is increased. As a result, liquid crystal molecules are deflected and pixels become bright. Since green pixels are much brighter, thus, a phenomenon such as becoming green occurs in the dark state, which seriously affects product quality.

SUMMARY

The present disclosure provides a color filter substrate, which can solve the problem of becoming green in dark state when a black matrix is an incomplete insulator and one part of the black matrix is located at a non-display region.

The present disclosure further provides a display component, which adopts the above color filter substrate to improve product quality.

In order to solve the above technical problem, the present disclosure provides a color substrate including a display region and a non-display region located at a periphery of the display region; wherein the color substrate further includes:

a black matrix configured to define a plurality of subpixel regions in the display region;

a filter layer configured to transmit light of specific colors and disposed in the subpixel regions;

a planarization layer covering the black matrix and the filter layer; wherein a part of the black matrix is located at the non-display region;

wherein the black matrix includes a portion to be connected; the black matrix is applied with a predetermined voltage through the portion to be connected.

In the above color substrate, optionally, the black matrix covers the entire non-display region.

In the above color substrate, optionally, a region of an outer edge of the black matrix corresponding to a predetermined position is removed.

In the above color substrate, optionally, the planarization layer in a region where the portion to be connected of the black matrix is located is removed.

In the above color substrate, optionally, the non-display region includes a sealing region; the portion to be connected of the black matrix is located at the sealing region.

In the above color substrate, optionally, the planarization layer is only located at the display region.

The present disclosure further provides a display component including a color filter substrate and an array substrate which are oppositely arranged to form a cell; wherein the array substrate includes a common electrode and a pixel electrode, and the color substrate adopts the above color filter substrate; wherein the array substrate applies a predetermined voltage to the black matrix through the portion to be connected of the black matrix.

In the above display component, optionally, the predetermined voltage is a voltage applied at the pixel electrode or a voltage applied at the common electrode when displaying in a dark state.

In the above display component, optionally, the color filter substrate includes a sealing region, and the array substrate includes a sealing region at a position corresponding to the sealing region of color filter substrate; the sealing regions are provided with a sealant configured to form a sealed space between the color substrate and the array substrate;

the portion to be connected of the black matrix is located at the sealing regions; the planarization layer in a region where the portion to be connected of the black matrix is located is removed, and the sealant contacts the portion to be connected;

the sealant includes a conductive component; the array substrate applies the predetermined voltage to the black matrix through the conductive component of the sealant and the portion to be connected of the black matrix.

In the above display component, optionally, the array substrate is a thin film transistor array substrate;

the array substrate includes a plurality of conductive layers and insulating layers between the conductive layers;

the conductive layers includes a gate metal layer, a source-drain metal layer and a first transparent conductive layer; the first transparent conductive layer is at an outermost layer of the array substrate;

the array substrate further includes a signal line configured to transmit the predetermined voltage; the conductive component of the sealant is electrically connected with the signal line;

the signal line is formed from the gate metal layer and/or the source-drain metal layer.

In the above display component, optionally, the conductive component of the sealant is electrically connected with the signal line through a via-hole in the insulating layers and the first transparent conductive layer filled in the via-hole.

In the above display component, optionally, the black matrix covers the entire non-display region.

In the above display component, optionally, the display component further includes an anti-static structure; wherein the array substrate includes a periphery region not directly facing the color filter substrate;

the anti-static structure includes:

a second transparent conductive layer disposed on a surface of the color filter substrate facing the black matrix;

a connection structure disposed at the periphery region of the array substrate;

wherein the connection structure is electrically connected with the second transparent conductive layer and configured to discharge charge accumulated at the second transparent conductive layer.

In the above display component, optionally, a region of an outer edge of the black matrix corresponding to a position of the connection structure is removed.

In the above display component, optionally, the region of the outer edge of the black matrix corresponding to the position of the connection structure is a rectangular having a length of 4 mm~8 mm and a width of 0.2 mm~0.5 mm; a long side of the rectangular is substantially parallel to a lateral side of the black matrix.

In the above display component, optionally, the conductive component is a conductive gold ball.

In the above display component, optionally, a size of the conductive gold ball is determined according to a cell thickness of the color filter substrate and the array substrate which are oppositely arranged to form the cell.

In the above display component, optionally, the connection structure is silver glue points or a conductive adhesive tape.

The above technical solutions of the present disclosure have following beneficial effects.

In the above technical solutions, for the liquid crystal display component which takes a transverse electric field as a driving electric field, when one part of the black matrix of the color filter substrate is located at the non-display region, the black matrix includes the portion to be connected, and a predetermined voltage is applied to the black matrix through the portion to be connected, so as to ensure that a voltage difference between the black matrix and the pixel electrode or between the black matrix and the common electrode is small enough to be unable to drive the liquid crystal molecules to deflect, thereby avoiding the undesirable phenomenon such as becoming green when displaying in the dark state, and improving production yield and display quality.

BRIEF DESCRIPTION OF THE DRAWINGS

In order to illustrate technical solutions according to embodiments of the present disclosure or in the related art more clearly, drawings to be used in the description of the related art or the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

Figure 1:
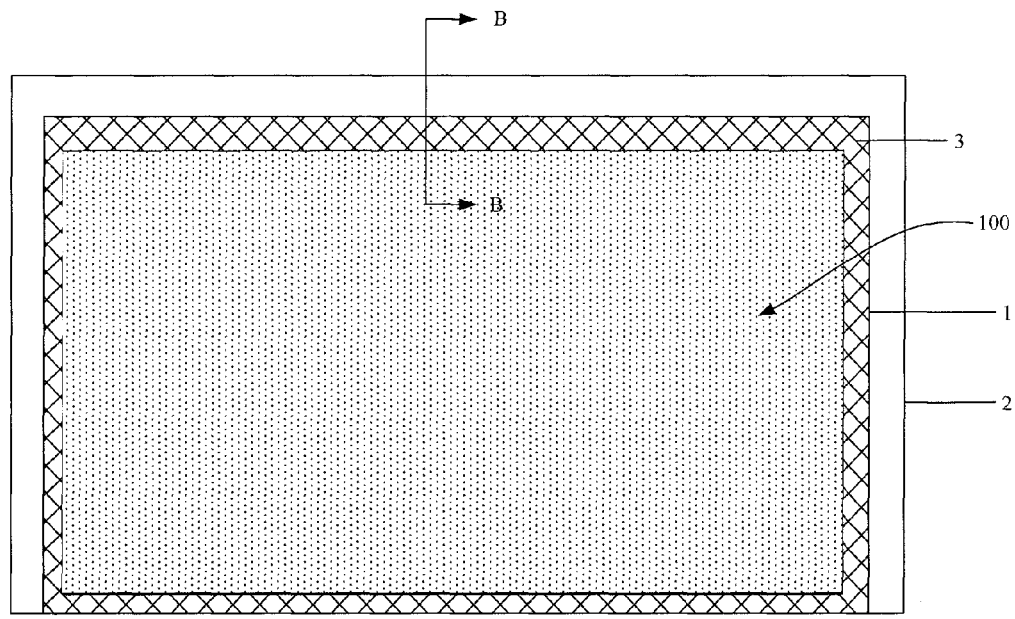
FIG. 1 is a top view of a liquid crystal panel in the related art.
Figure 2:
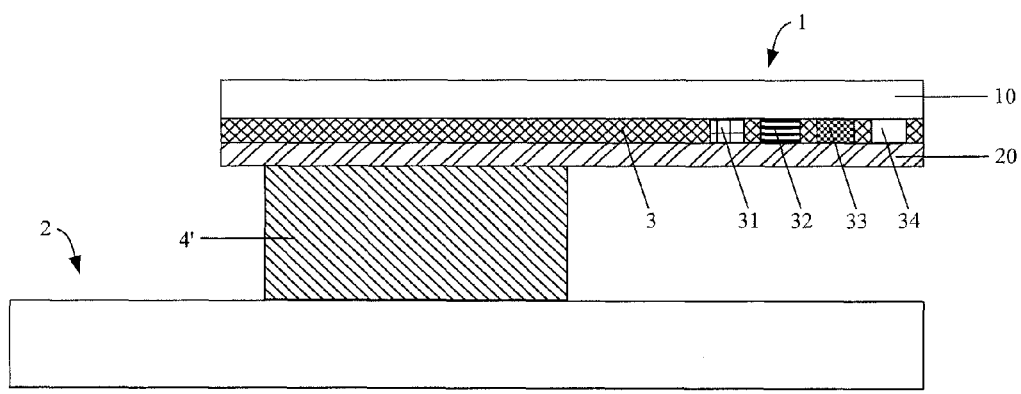
FIG. 2 is a sectional view taken along a line B-B of FIG. 1.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

For a liquid crystal display component (i.e., a liquid crystal panel or a display device) which takes a transverse electric field as a driving electric field, both a pixel electrode and a common electrode are located on an array substrate. The pixel electrode or the common electrode is a slit electrode located at an outermost layer at one side of the array substrate facing a color filter substrate. Since a black matrix of the color filter substrate is an incomplete insulator, the black matrix can induce a voltage of the slit electrode due to the capacitor effect and accumulates a certain amount of charge. Specifically, when the pixel electrode is located at the outermost layer at one side of the array substrate facing the color filter substrate, the black matrix can induce a voltage of the pixel electrode; when the common electrode is located at the outermost layer at one side of the array substrate facing the color filter substrate, the black matrix can induce a voltage of the common electrode.

When one part of the black matrix is located at a non-display region, the black matrix is easily grounded or contacts other low voltages to discharge charge, which leads to a drop of an induced voltage of the black matrix, resulting that a voltage difference between the black matrix and the slit electrode is increased when displaying in the dark state. Then, an interference electric field is formed to drive liquid crystal molecules to deflect, which causes undesirable phenomenon such as becoming green in the dark state.

For the above technical problem, the present disclosure provides a color substrate, and a black matrix of the color substrate includes a portion to be connected. A predetermined voltage is applied to the black matrix through the portion to be connected, to ensure that a voltage difference between the black matrix and the pixel electrode or between the black matrix and the common electrode is small enough to be unable to drive the liquid crystal molecules to deflect, thereby overcoming the problem of becoming green when displaying in the dark state.

When a liquid crystal display component adopts the color filter substrate of the present disclosure, production yield and display quality can be improved.

Implementation of the present disclosure will be described hereinafter in details in conjunction with the drawings and embodiments. The following embodiments are used to illustrate the present disclosure but not used to limit the scope of the present disclosure.

Figure 3:
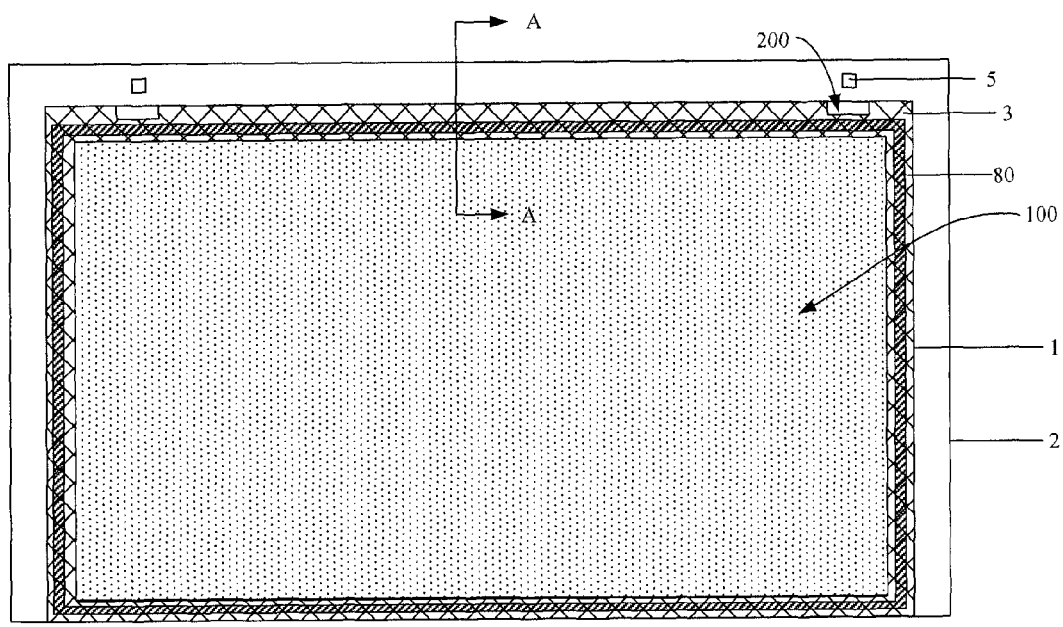
FIG. 3 is a top view of a liquid crystal panel according to one embodiment of the present disclosure.
Figure 4:
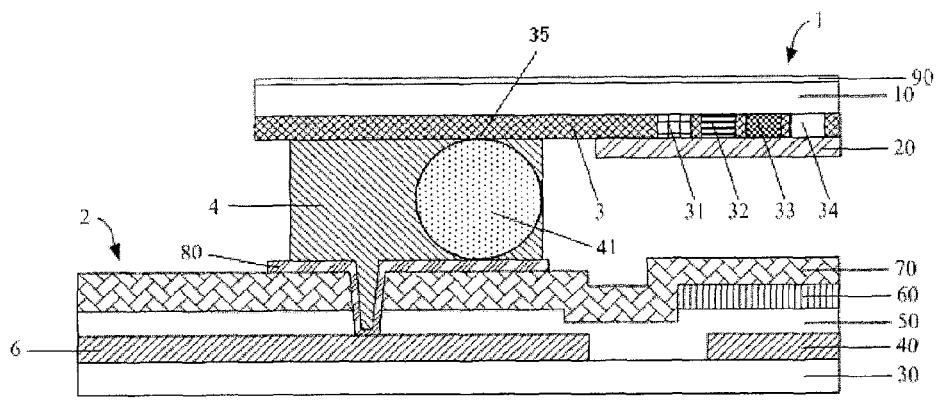
FIG. 4 is a sectional view taken along a line A-A of FIG. 3.

Referring to FIG. 3 and FIG. 4, a color substrate 1 provided in one embodiment of the present disclosure includes a display region 100 and a non-display region located at a periphery of the display region.

The color substrate 1 includes a black matrix 3 configured to define a plurality of subpixel regions in the display region 100. A filter layer configured to transmit light of specific colors is disposed in the subpixel regions to realize color display. The filter layer includes a red filter layer 31, a green filter layer 32 and a blue filter layer 33, and may further include a white filter layer 34 so as to increase display brightness, improve light utilization and reduce power consumption. Of course, the filter layer may also include a combination of other colors which can realize color display, which will not be defined here.

A planarization layer 20 is covered on surfaces of the black matrix 3 and the filter layer, and is usually made of acrylic. In order to ensure that the liquid crystal molecules are regularly arranged, an alignment film (not shown) is further provided on the planarization layer 20. Spacers which are used to maintain a cell thickness of a liquid crystal panel may be located on the color filter substrate, or may also be located on the array substrate. The liquid crystal panel is formed by oppositely arranging the color filter substrate with respect to the array substrate to from a cell, which is sealed by a sealant 4 disposed at sealing regions to form a sealed space for filling liquid crystal molecules therein. The sealing regions are located at the non-display region of the color filter substrate and the array substrate.

For a liquid crystal display component which takes a transverse electric field as a driving electric field, both a pixel electrode and a common electrode are located on the array substrate 2. The pixel electrode or the common electrode is a slit electrode located at an outermost layer at one side of the array substrate 2 facing the color filter substrate 1. Since the black matrix 3 of the color filter substrate 1 is an incomplete insulator, thus the black matrix 3 can induce a voltage of the slit electrode. When one part of the black matrix 3 is located at the non-display region, the black matrix 3 is easily grounded or contacts other low voltages, which leads to a drop of an induced voltage of the black matrix 3, resulting that a voltage difference between the black matrix 3 and the slit electrode is increased and then an interference electric field is formed to drive the liquid crystal molecules to deflect. Since the green is much brighter, thus, an undesirable phenomenon such as becoming green occurs in the dark state.

In one embodiment of the present disclosure, the black matrix 3 includes the portion to be connected 35, and a predetermined voltage is applied to the black matrix 3 through the portion to be connected, so as to ensure that the voltage of the black matrix 3 is maintained stable. The predetermined voltage is specifically a voltage applied to the pixel electrode or a voltage applied to the common electrode when displaying in the dark state. As a result, when displaying in the dark state, a voltage difference between the black matrix 3 and the pixel electrode or between the black matrix 3 and the common electrode is small enough to be unable to drive the liquid crystal molecules to deflect, thereby overcoming the problem of becoming green when displaying in the dark state and improving production yield and display quality.

Specifically, when the pixel electrode of the array substrate 2 is located at the outermost layer, the predetermined voltage is the voltage applied to the pixel electrode when displaying in the dark state, so as to ensure that the voltage difference between the black matrix 3 and the pixel electrode is small when displaying in the dark state. When the common electrode of the array substrate 2 is located at the outermost layer, the predetermined voltage is the voltage applied to the common electrode, so as to ensure that the voltage difference between the black matrix 3 and the common electrode is small when displaying in the dark state.

Optionally, the black matrix 3 of the color filter substrate 1 covers the entire non-display region, so as to prevent light from leaking from the periphery when displaying in the dark state.

In a specific embodiment, the planarization layer 20 in a region where the portion to be connected of the black matrix 3 is located, is removed, so that the portion to be connected is exposed to outside, thereby facilitating connection. The portion to be connected is specifically set in the non-display region, so as to not affect normal display of the display region.

In order to achieve the above structure, the planarization layer 20 may be located only at the display region 100, so as to expose parts of the black matrix 3 located at the non-display region, including the portion to be connected. Of course, a via-hole may also be defined in the planarization layer 20 to expose the portion to be connected of the black matrix 30.

In order to apply the predetermined voltage to the black matrix 3 through the portion to be connected of the black matrix 3, a corresponding conductive component may be provided. One end of the conductive component is connected with the portion to be connected, and the other end of the conductive component is connected with a circuit or a voltage source which provides the predetermined voltage to transmit the predetermined voltage.

Optionally, the portion to be connected of the black matrix 3 is located at the sealing regions of the non-display region; since the planarization layer 20 in the region where the portion to be connected is located, is removed, so that the portion to be connected is exposed to outside, thus, when the liquid crystal panel is formed by oppositely arranging the color filter substrate with respect to the array substrate to form a cell, the sealant 4 located at the sealing regions contacts the portion to be connected. By adding the conductive component 41 such as a conductive gold ball in the sealant 4, the array substrate can supply the predetermined voltage to the black matrix 3 through the conductive component in the sealant 4 and the portion to be connected of the black matrix 3 in turns. That is, the sealant 4 has two functions including sealing and conducting, so that the predetermined voltage can be applied to the black matrix 3 merely through existed components, and it does not have to require a separate process to manufacture a desired connection component for transmitting the predetermined voltage, thereby simplifying the manufacture process.

The size of the conductive gold ball 41 can be determined according to parameters such as the cell thickness of the liquid crystal panel.

Hereinafter, a thin film transistor array substrate is taken as an example to illustrate in details how the array substrate supplies the predetermined voltage to the black matrix 3 through the portion to be connected of the black matrix 3.

The portion to be connected of the black matrix 3 is located at the sealing regions and is exposed to outside. The conductive gold ball 41 is added in the sealant 4 which is configured to seal the array substrate and the color filter substrate, and is in contact with the portion to be connected.

A driving chip is disposed at the non-display region of the thin film transistor array substrate. The driving chip provides for the display region signals required for displaying through signal lines. The signal lines include a first signal line 6 configured to transmit a voltage applied at the pixel electrode or a voltage applied at the common electrode when displaying in the dark state (i.e., the predetermined voltage applied at the black matrix 3).

In one embodiment of the present disclosure, the sealant 4 is electrically connected with the first signal line 6 to obtain a voltage signal applied at the pixel electrode or a voltage signal applied at the common electrode when displaying in the dark state, and transmit the obtained voltage signal to the portion to be connected of the black matrix 3.

The thin film transistor array substrate includes a plurality of conductive layers and insulating layers between the conductive layers. The conductive layers include a gate metal layer 40, a source-drain metal layer 60 and a first transparent conductive layer 80. The first transparent conductive layer 80 is at the outermost layer of the array substrate, and is configured to form the pixel electrode or the common electrode. The first signal line 6, configured to transmit the predetermined voltage applied at the black matrix 3, may include at least one of the gate metal layer 40 and the source-drain metal layer 60.

Specifically, the conductive component of the sealant 4 may be electrically connected with the first signal line 6 through a via-hole in the insulating layers and the first transparent conductive layer 80 filled in the via-hole of the insulating layers.

For a bottom-gate type thin film transistor array substrate, the gate metal layer 40, the source-drain metal layer 60 and the first transparent conductive layer 80 are disposed on a base substrate 30 in sequence. The insulating layers on the array substrate includes a gate insulating layer 50 located between the gate metal layer 40 and the source-drain metal layer 60, and an interlayer insulating layer 70 located between the source-drain metal layer 60 and the first transparent conductive layer 80. When the first signal line 6, which is configured to transmit the predetermined voltage, includes only the gate metal layer 40, the sealant 40 is electrically connected with the first signal line 6 through a via-hole penetrating through the gate insulating layer 50 and the interlayer insulating layer 70, and the first transparent conductive layer 80 filled in the via-hole.

Of course, the first signal line 6 may also include only the source-drain metal layer 60, or include the gate metal layer 40 and the source-drain metal layer 60.

A semiconductor device is usually provided with an anti-static structure for discharging static electricity, to protect the product from electrostatic interference so as to work normally.

In one embodiment of the present disclosure, an anti-static structure of the display component includes:

a second transparent conductive layer 90 disposed on a surface of the color filter substrate 1 facing the black matrix 3;

a connection structure 5 disposed at a periphery region of the array substrate 2, the periphery region of the array substrate 2 not directly facing the color filter substrate 1.

The connection structure 5 is connected with the second transparent conductive layer 90, and is configured to discharge charge accumulated at the second transparent conductive layer 90. Specifically, another end of the connection structure 5 is grounded to discharge charge.

The connection structure 5 may be silver glue points or a conductive adhesive tape.

Further, when the black matrix 3 of the color filter substrate covers the entire non-display region, in order to prevent the black matrix 3 from connecting with the connection structure 5, a region 200 of an edge of the black matrix 3 corresponding to a position of the connection structure is removed. The region 200 in the black matrix 3 is specifically a rectangular having a length of 4 mm~8 mm and a width of 0.2 mm~0.5 mm. A long side of the region 200 is substantially parallel to a lateral side of the black matrix 3. The region 200 is not limited to rectangular, and any shape which can prevent the black matrix 3 from connecting with the connection structure 5 falls within the scope of the present disclosure.

Referring to FIG. 3 and FIG. 4, the color substrate 1 of one embodiment of the present disclosure specifically includes:

a first base substrate 10, such as a transparent glass substrate, a transparent quartz substrate or an organic resin substrate;

a black matrix 3 disposed on the first base substrate 10 and configured to define a plurality of subpixel regions at a display region 100 and cover a non-display region located at a periphery of the display region 100, the black matrix 3 including a portion to be connected 35 in a sealing region;

red color filter layers 31, green color filter layers 32, blue color filter layers 33 and white color filter layers 34 located at the subpixel regions;

a planarization layer 20 covering the black matrix 3 and each color filter layer, and located only at the display region 100;

an alignment film (not shown) disposed on the planarization layer 20;

a second transparent conductive layer 90 disposed on a surface of the first base substrate 10 facing the black matrix 3, and configured to discharge static electricity of a display component.

Referring to FIG. 3 and FIG. 4, the display component of one embodiment of the present disclosure specifically includes:

the above color substrate 1;

an array substrate 2 including a periphery region which does not directly face the color filter substrate 1;

a sealant 4 disposed at sealing regions of the array substrate 1 and the array substrate 2, the sealant 4 filled with a conductive gold ball.

The array substrate 2 includes a second base substrate 30 such as a transparent glass substrate, a transparent quartz substrate or an organic resin substrate, and a thin film transistor and a first signal line 6 disposed on the second base substrate 30. The first signal line 6 is configured to transmit a voltage applied at the common electrode. A gate electrode of the thin film transistor is formed from the gate metal layer 40; either of a source electrode and a drain electrode of the thin film transistor is formed from the source-drain metal layer 60; the first signal line 6 is formed from the gate metal layer 40. The common electrode layer is formed from the first transparent conductive layer 80; the pixel electrode is formed from a third transparent conductive layer (not shown). The gate metal layer 40, the gate insulating layer 50, the source-drain metal layer 60, a passivation layer, the third transparent conductive layer (not shown), the interlayer insulating layer 70 and the first transparent conductive layer 80 are disposed on the second base substrate 30 in sequence. The pixel electrode is electrically connected with the drain electrode through a via-hole of the passivation layer.

The first transparent conductive layer 80 fills the via-hole penetrating through the gate insulating layer 50 and the interlayer insulating layer 70. One end of the sealant 4 is in contact with the portion to be connected of the black matrix 3, the other end is electrically connected with the first signal line 6 through the via-hole and the first transparent conductive layer 80 filled in the via-hole. The voltage signal transmitted via the first signal line 6 is transmitted to the common electrode, and is transmitted to the black matrix 3 through the via-hole, the first transparent conductive layer 80 filled in the via-hole and the conductive gold ball 41 in the sealant 4, so that the voltage difference between the black matrix 3 and the common electrode is small when displaying in the dark state.

In the technical solutions of the present disclosure, for the liquid crystal display component which takes a transverse electric field as the driving electric field, when one part of the black matrix of the color filter substrate is located at the non-display region, the black matrix includes the portion to be connected, and a predetermined voltage is applied to the black matrix through the portion to be connected, so as to ensure that a voltage difference between the black matrix and the pixel electrode or between the black matrix and the common electrode is small enough to be unable to drive the liquid crystal molecules to deflect, thereby avoiding the undesirable phenomenon such as becoming green when displaying in the dark state, and improving production yield and display quality.

Those described above are only optional embodiments of the present disclosure. For those skilled in the art, some modifications and alternations may be made without departing from the basic concept of the present disclosure, and these should fall within the scope of the present disclosure.

What is claimed is:

1. A color substrate comprising a display region and a non-display region located at a periphery of the display region; wherein the color substrate further comprises:
    a black matrix configured to define a plurality of subpixel regions in the display region;
    a filter layer configured to transmit light of specific colors and disposed in the subpixel regions;
    a planarization layer covering the black matrix and the filter layer; wherein a part of the black matrix is located at the non-display region;
    wherein the black matrix comprises a portion to be connected; the black matrix is applied with a predetermined voltage through the portion to be connected,
    wherein the black matrix covers the entire non-display region,
    wherein a region of an outer edge of the black matrix corresponding to a predetermined position is removed.

2. The color filter substrate according to claim 1, wherein the planarization layer in a region where the portion to be connected of the black matrix is located is removed.

3. The color filter substrate according to claim 2, wherein the non-display region comprises a sealing region;
    the portion to be connected of the black matrix is located at the sealing region.

4. The color filter substrate according to claim 3, wherein the planarization layer is only located at the display region.

5. A display component comprising a color filter substrate and an array substrate which are oppositely arranged to form a cell; wherein the array substrate comprises a common electrode and a pixel electrode, and the color substrate adopts the color filter substrate according to claim 1;
    wherein the array substrate applies a predetermined voltage to the black matrix through the portion to be connected of the black matrix.

6. The display component according to claim 5, wherein the predetermined voltage is a voltage applied at the pixel electrode or a voltage applied at the common electrode when displaying in a dark state.

7. The display component according to claim 5, wherein the color filter substrate comprises a sealing region, and the array substrate comprises a sealing region at a position corresponding to the sealing region of color filter substrate; the sealing regions are provided with a sealant configured to form a sealed space between the color substrate and the array substrate;
    the portion to be connected of the black matrix is located at the sealing regions; the planarization layer in a region where the portion to be connected of the black matrix is located is removed, and the sealant contacts the portion to be connected;
    the sealant comprises a conductive component; the array substrate applies the predetermined voltage to the black matrix through the conductive component of the sealant and the portion to be connected of the black matrix.

8. The display component according to claim 7, wherein the array substrate is a thin film transistor array substrate;
    the array substrate comprises a plurality of conductive layers and insulating layers between the conductive layers;
    the conductive layers comprises a gate metal layer, a source-drain metal layer and a first transparent conductive layer; the first transparent conductive layer is at an outermost layer of the array substrate;
    the array substrate further comprises a signal line configured to transmit the predetermined voltage; the conductive component of the sealant is electrically connected with the signal line;
    the signal line is formed from the gate metal layer and/or the source-drain metal layer.

9. The display component according to claim 8, wherein the conductive component of the sealant is electrically connected with the signal line through a via-hole in the insulating layers and the first transparent conductive layer filled in the via-hole.

10. The display component according to claim 7, wherein the conductive component is a conductive gold ball.

11. The display component according to claim 10, wherein a size of the conductive gold ball is determined according to a cell thickness of the color filter substrate and the array substrate which are oppositely arranged to form the cell.

12. The display component according to claim 5, further comprising an anti-static structure; wherein the array substrate comprises a periphery region not directly facing the color filter substrate;
    the anti-static structure comprises:
    a second transparent conductive layer disposed on a surface of the color filter substrate facing the black matrix;
    a connection structure disposed at the periphery region of the array substrate;
    wherein the connection structure is electrically connected with the second transparent conductive layer and configured to discharge charge accumulated at the second transparent conductive layer.

13. The display component according to claim 12, wherein the connection structure is silver glue points or a conductive adhesive tape.

14. The display component according to claim 5, wherein the region of the outer edge of the black matrix corresponding to the position of the connection structure is a rectangular having a length of 4 mm~8 mm and a width of 0.2 mm~0.5 mm; a long side of the rectangular is substantially parallel to a lateral side of the black matrix.

* * * * *